(12) United States Patent
Nicol, II et al.

(10) Patent No.: US 8,756,530 B2
(45) Date of Patent: Jun. 17, 2014

(54) GENERATION AND SYNCHRONIZATION OF OFFLINE 3D VIRTUAL WORLD CONTENT

(75) Inventors: William B. Nicol, II, Durham, NC (US); Brian R. Bokor, Raleigh, NC (US); Andrew B. Smith, Morrisville, NC (US); Daniel E. House, Raleigh, NC (US); Peter F. Haggar, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1334 days.

(21) Appl. No.: 12/127,089

(22) Filed: May 27, 2008

(65) Prior Publication Data

US 2009/0300582 A1    Dec. 3, 2009

(51) Int. Cl.
*G06F 3/048* (2013.01)
(52) U.S. Cl.
USPC ......................................................... 715/848
(58) Field of Classification Search
USPC ................. 715/850, 848, 852, 706, 757, 782
See application file for complete search history.

(56) References Cited

U.S. PATENT DOCUMENTS

| 7,168,051 | B2* | 1/2007 | Robinson et al. | 715/848 |
|---|---|---|---|---|
| 2003/0122858 | A1* | 7/2003 | Mauve | 345/706 |
| 2008/0104195 | A1* | 5/2008 | Hawkins et al. | 709/217 |
| 2008/0215995 | A1* | 9/2008 | Wolf | 715/758 |
| 2009/0132403 | A1* | 5/2009 | Titus et al. | 705/35 |
| 2009/0177717 | A1* | 7/2009 | Meehan et al. | 707/204 |
| 2009/0235183 | A1* | 9/2009 | Hamilton et al. | 715/757 |

* cited by examiner

*Primary Examiner* — Rashawn Tillery
(74) *Attorney, Agent, or Firm* — Ester F. Queen; Moore & Van Allen PLLC (57) ABSTRACT

Generation and synchronization of offline three-dimensional (3D) virtual world content that include hosting 3D virtual world content, providing access to a portion of the 3D virtual world content, allowing storing offline of a copy of the accessed portion of the 3D virtual world content, and receiving changes made in the stored offline copy of the accessed portion of the 3D virtual world content and synchronizing the received changes with the hosted 3D virtual world content. The accessed portion of the 3D virtual world content may be recreated offline using a rendering engine on a processing device offline from the hosted 3D virtual world.

12 Claims, 6 Drawing Sheets

GENERATION AND SYNCHRONIZATION OF OFFLINE 3D VIRTUAL WORLD CONTENT

BACKGROUND OF THE INVENTION

The present invention is related to virtual world, and more specifically to generation and synchronization of offline three-dimensional (3D) virtual world content.

One of the challenges with 3D virtual worlds is that you need to be online to actually experience, participate, build, or make modifications to the virtual world. Sometimes it would be desirable to be able to experience the virtual world offline. It would also be valuable to be able to create new virtual world content offline. Currently, there is no way to experience or perform offline virtual world activity.

BRIEF SUMMARY OF THE INVENTION

According to one aspect of the present invention, a method for providing three-dimensional (3D) virtual world content that includes hosting 3D virtual world content, providing access to a portion of the 3D virtual world content, allowing storing offline of a copy of the accessed portion of the 3D virtual world content, and receiving changes made in the stored offline copy of the accessed portion of the 3D virtual world content and synchronizing the received changes with the hosted 3D virtual world content.

According to another aspect of the present invention, a method for generation and deployment of offline three-dimensional (3D) virtual world content that includes creating 3D virtual world content offline from live 3D virtual world content, accessing the live 3D virtual world content, and deploying and synchronizing the created 3D virtual world content into the live 3D virtual world content.

According to a further aspect of the present invention, a system for generation and synchronization of offline three-dimensional (3D) virtual world content that includes a server, and a network interface coupling the server with a workstation, wherein the server hosts a 3D virtual world content allowing a user at the workstation to control an avatar in the 3D virtual world to select a portion of virtual world content in the 3D virtual world and store offline of a copy of the selected portion of 3D virtual world content, the network interface further being capable of receiving changes made in the stored offline copy of the selected portion of virtual world content, the server being capable of synchronizing the received changes with the hosted 3D virtual world content.

According to a still further aspect of the present invention, a computer program product comprising a computer useable medium having computer useable program code embodied therewith, the computer useable program code comprising computer useable program code configured to host 3D virtual world content, computer useable program code configured to provide access to a portion of the 3D virtual world content, computer useable program code configured to allow storing offline of a copy of the accessed portion of the 3D virtual world content, and computer useable program code configured to receive changes made in the stored offline copy of the accessed portion of the 3D virtual world content and synchronize the received changes with the hosted 3D virtual world content.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain or store the program for use by or in connection with the instruction execution system, platform, apparatus, or device.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments according to the present invention allow users to perform offline three-dimensional (3D) virtual world activities and then, deploy or synchronize the results to those activities within the live 3D virtual world. Therefore, 3D virtual world content may be generated offline and then uploaded to the live 3D virtual world. According to embodiments of the present invention, a part of a virtual world may be captured and stored offline. The captured virtual world content may then be run on a processing device, which is disconnected from the live 3D virtual world, allowing the same experience for a user as would be available in the live or online 3D virtual world, as well as, the ability to generate new 3D virtual world content. The captured snapshot of a particular region or portion of the live 3D virtual world may be stored on the disconnected processing device and have full functionality with virtual world server capabilities.

A user may be allowed to explore a particular section or portion of the virtual world by a local virtual world module or other means and to make offline changes to the virtual world portion while not being connected, however, when the user (controlling an avatar in the virtual world) returns to an online connection, they may replicate any changes that the user was permitted to make within the offline virtual world portion and synch this content up with the live or online virtual world. Changes may include objects created, objects modified, new content, etc. The offline capabilities may also provide better performance at build time for complex components by removing network bandwidth constraints. The processing device may be any type of processing device such as for example, a personal computer, a server, a workstation, etc. The local virtual world module may be downloaded from a server hosting the virtual world environment in association with capturing and downloading the snapshot of the particular region or portion of the live 3D virtual world. In another embodiment of the present invention, the local virtual world module may be obtained from a vendor or third party and preloaded on the processing device.

According to embodiments of the present invention, as noted previously, a section of a live virtual world may be downloaded to a processing device such as a personal computer. The processing device is then disconnected from the live 3D virtual world. Any changes that are allowed to be made by a user in the downloaded section of the virtual world may be uploaded and synchronized back to the live 3D virtual world environment once a live connection is reestablished. For example, a user may crop a section of the virtual world for offline use by drawing a square on a map. Before downloading this portion of the map, the processing device may determine, or an application running on the processing device, such a local virtual world module or other means, may permit determining if there is enough storage available for storing the cropped section of the virtual world and alert the user accordingly. A user may also crop multiple sections of the virtual world. This may be accomplished via a "rubber band" mechanism that may give the user the ability to grab an object in 3D. In addition, according to embodiments of the present invention, once the section of the 3D virtual world system has been cropped, the user may be offered the option of placing a "block" on that section of the live virtual world, thus preventing any other user from making changes to that section of the virtual world. Multiple users may download and use portions of the virtual world but may not be able to change content in the downloaded portion if the portion of the live 3D virtual world content has been blocked. If the "cropped" section of the virtual world is not "blocked", then a policy of "last change wins" may take effect when changes are uploaded to the live 3D virtual world and synchronized.

A user may have a preinstalled local virtual world rendering engine on the user's processing device allowing recreation of selected virtual world content. Attributes and data elements of the live 3D virtual world may be downloaded into the local virtual world rendering engine. The user may then be free to experience the downloaded section of the virtual world while offline and may be allowed to create objects and other portions of virtual world content in the offline section of the virtual world by the virtual world rendering engine. For any changes made to the offline section of the virtual world offline (e.g., creating new objects, etc.), data that describes these changes may be stored in a separate storage location from where the downloaded virtual world is stored. After reconnection back to the live or online 3D virtual world, a user may then be permitted by the virtual world environment to synchronize any changes made in the offline virtual world content. Any new virtual objects that were created may be updated in the live 3D virtual world. Further, at the same time, objects created in the live 3D virtual world while the user was offline, may be updated in the user's offline section of the virtual world (if that portion of the live 3D virtual world was not blocked).

Moreover, according to embodiments of the present invention, a user may be allowed by the rendering engine, local virtual world module or other means to create virtual world objects and content outside of the virtual world (e.g., objects and content that does not currently exist in the online or live 3D virtual world) without having downloaded any content from the live 3D virtual world. Once created, the user may connect to the live 3D virtual world content and deploy the newly created virtual world objects and content. The created virtual world objects and content may be deployed to a specific section/location (e.g., xyz coordinate) of the live 3D virtual world.

Figure 1:
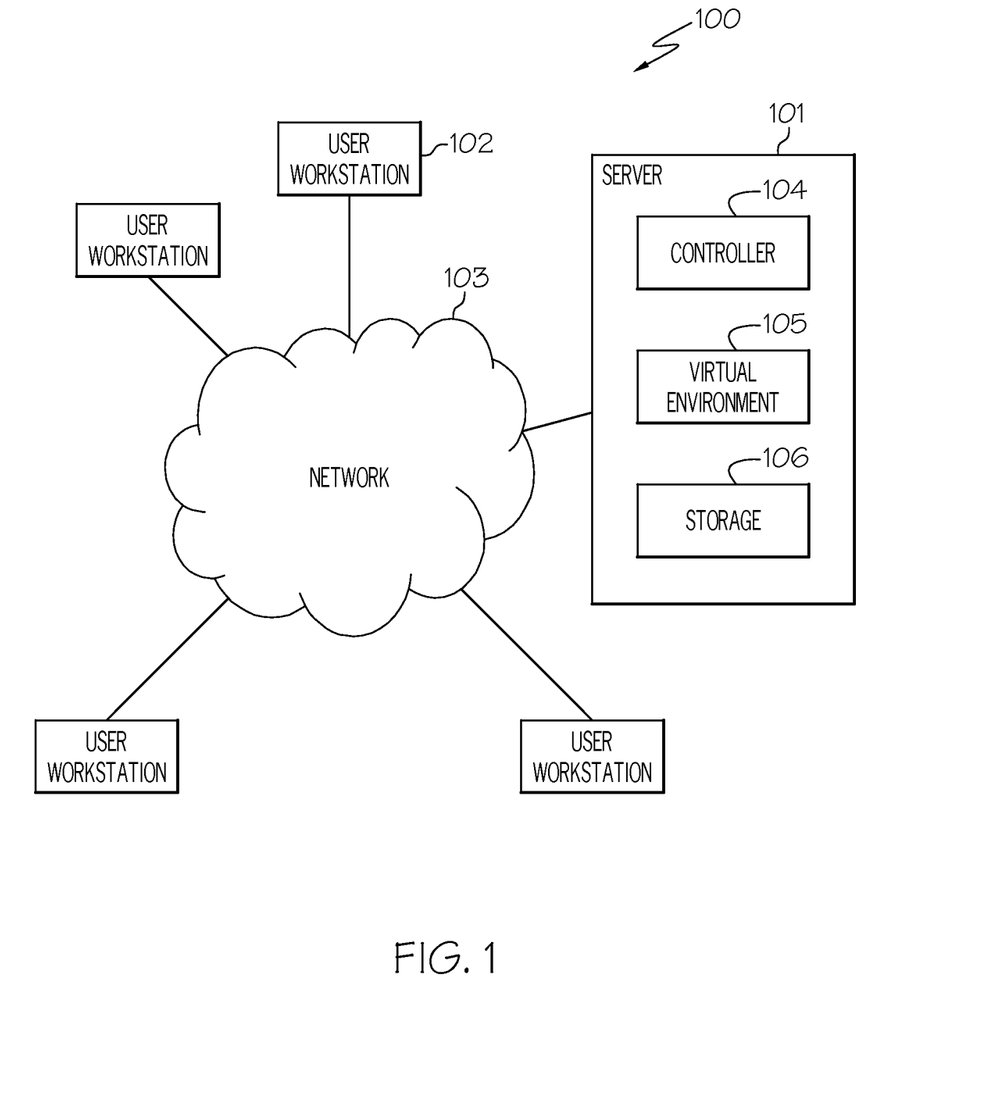
FIG. 1 is a diagram of system for generation and synchronization of offline three-dimensional (3D) virtual world content according to an example embodiment of the present invention.

FIG. 1 shows a diagram of system for generation and synchronization of offline three-dimensional (3D) virtual world content according to an example embodiment of the present invention. The system 100 may include a server 101 and one or more workstations 102 where the server 101 and the one or more workstations 102 may be interconnected to a network 103. Although one server 101 is shown, there may be multiple servers connected to the network 103 and accessible by the one or more workstations 102. The server 101 may host the virtual environment 105 and also contain a controller 104 and storage 106. Therefore, a user at a workstation 102 may access the virtual environment 105 hosted on the server 101 and control an avatar in the virtual environment 105 to select a portion of 3D virtual world content from online or live 3D virtual world content. The user may then store offline the selected portion of 3D virtual world content taken from live 3D virtual world content. The user may access the offline 3D virtual world content and experience the portion of 3D virtual world offline, and may generate new virtual world content. Changes in the offline 3D virtual world content that occurred while accessing the offline 3D virtual world content may then be uploaded to the live 3D virtual world and synchronized with the live 3D virtual world content.

Figure 2:
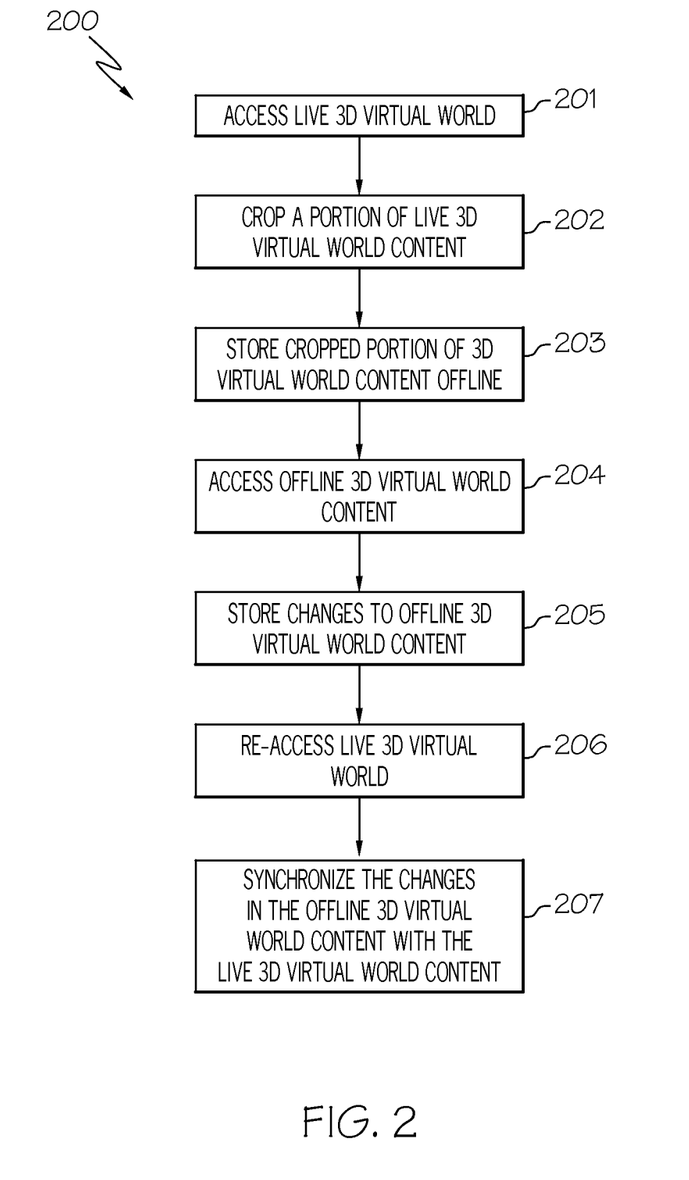
FIG. 2 is a flowchart of a process for generation and synchronization of offline three-dimensional (3D) virtual world content according to an example embodiment of the present invention.

FIG. 2 shows a flowchart of a process for generation and synchronization of offline three-dimensional (3D) virtual world content according to an example embodiment of the present invention. In the process 200, in block 201, live 3D virtual world may be accessed. In block 202, a portion of the live 3D virtual world content may be selected or cropped. In block 203, the selected/cropped portion of the 3D virtual world content may be stored offline. In block 204, the offline 3D virtual world content may be accessed and in block 205, any changes to the offline 3D virtual world content may be stored. In block 206, the live 3D virtual world may be re-accessed and in block 207, the changes in the offline 3D virtual world content may be uploaded to the live 3D virtual world and synchronized with the live 3D virtual world content.

Figure 3:
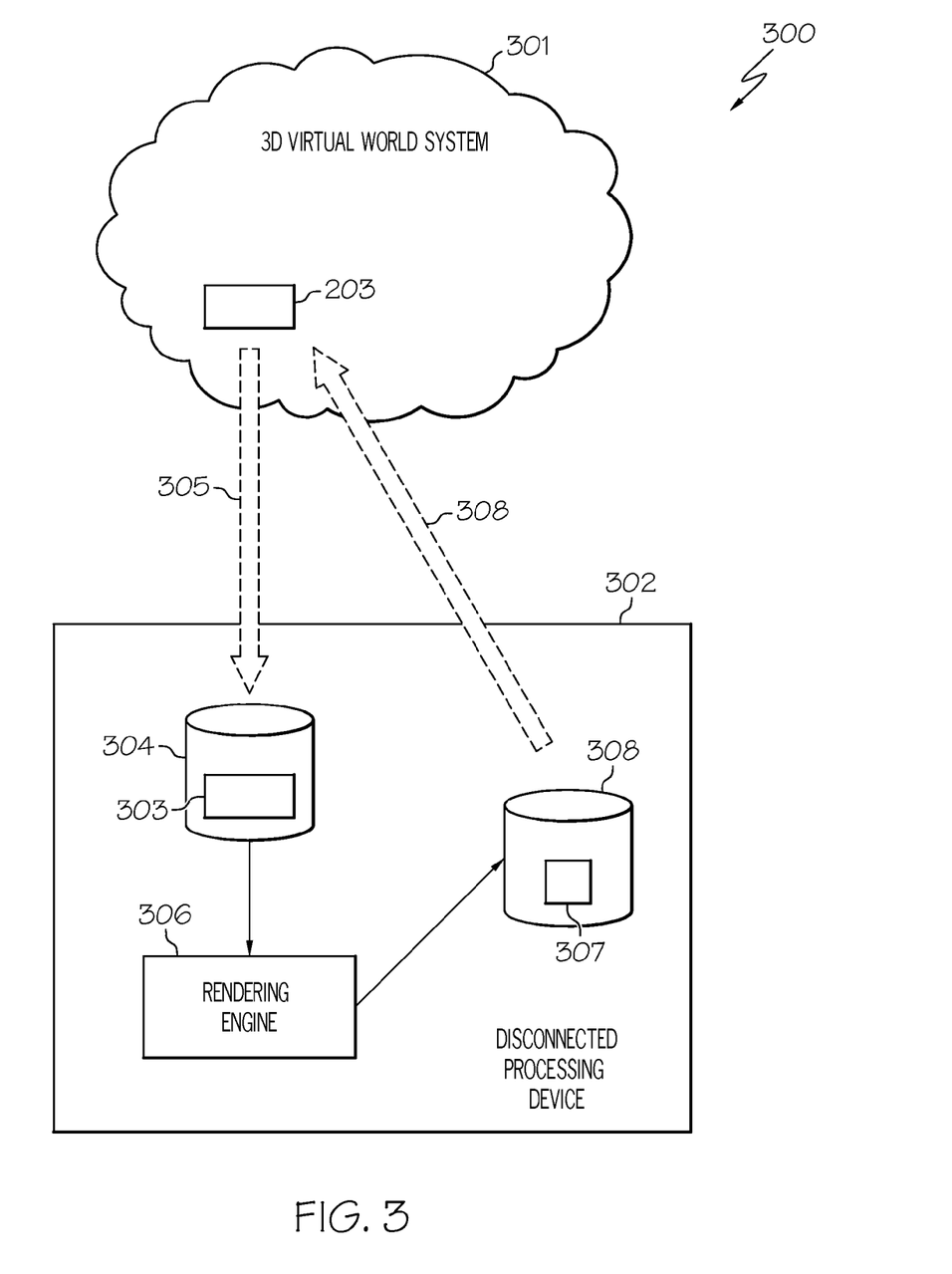
FIG. 3 is a diagram of a system for generation and synchronization of offline 3D virtual world content according to another example embodiment of the present invention.

FIG. 3 shows a diagram of a system for generation and synchronization of offline 3D virtual world content according to another example embodiment of the present invention. The system 300 may include a 3D virtual world system 301 and a processing device 302. The 3D virtual world system 301 may be hosted on a server (not shown). The processing device 302 may connect to the 3D virtual world system and a user may select a section 203 of the 3D virtual world system 301 and may download 305 and store the downloaded section 303 on a storage device 304 on the processing device 302. The processing device 302 may then be disconnected from the server hosting the live 3D virtual world system 301. A rendering engine 306 or other local or remote virtual world module operable on the processing device 302 renders the virtual world section 303 of the 3D virtual world system allowing a user to access the section 303 and experience offline the downloaded section 303 of virtual world, also make changes or add new content to the downloaded section 303 of virtual world. Any new virtual world content 307 created by the user may be stored in the same storage device 304 or a separate storage device 308. In this example embodiment, the newly created objects and virtual world content 307 is stored in a separate storage device 308. The processing device 302 may reconnect to the 3D virtual world system 301 and upload 308 the newly created virtual world content 307 where it may be synchronized with the existing live 3D virtual world content in the 3D virtual world system 301. Although the storage device containing the downloaded virtual world content 303 and the separate storage device 308 containing new virtual world content 307 are shown as existing in the processing device 302, these storage devices may exist outside of the processing device 302.

Figure 4:
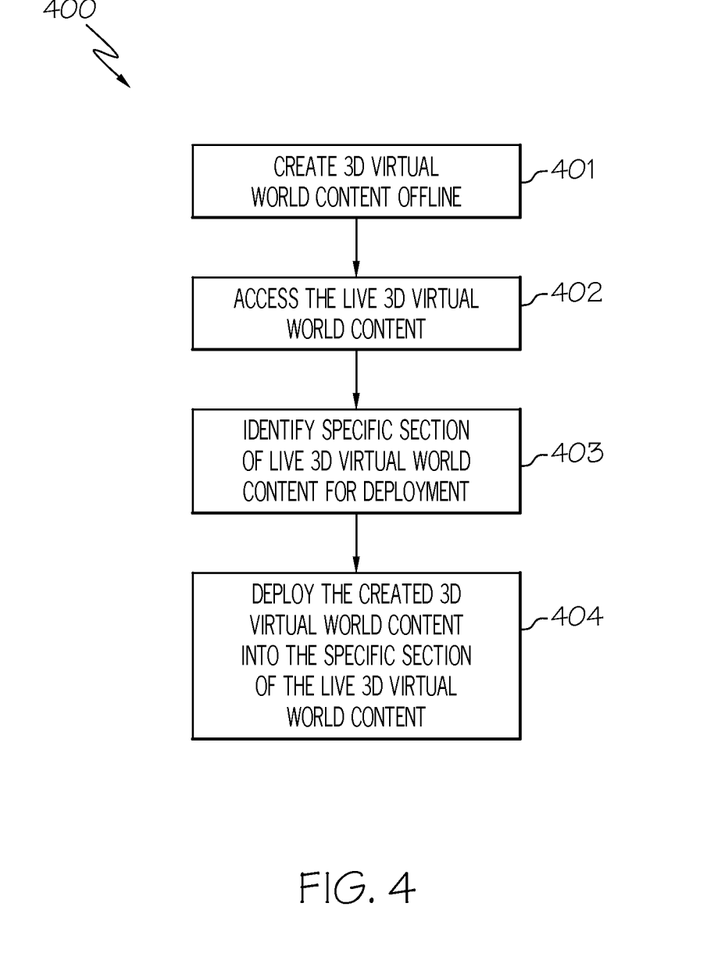
FIG. 4 is a flowchart of a process for generation and deployment of offline 3D virtual world content according to an example embodiment of the present invention.

FIG. 4 shows a flowchart of a process for generation and deployment of offline 3D virtual world content according to an example embodiment of the present invention. In the process 400, in block 401, 3D virtual world content may be created offline. In block 402, the live 3D virtual world may be accessed. In block 403, a specific section of the live 3D virtual world content may be identified for deployment of the created 3D virtual world content. In block 404, the created 3D virtual world content may be deployed into the specific section of the live 3D virtual world.

Figure 5:
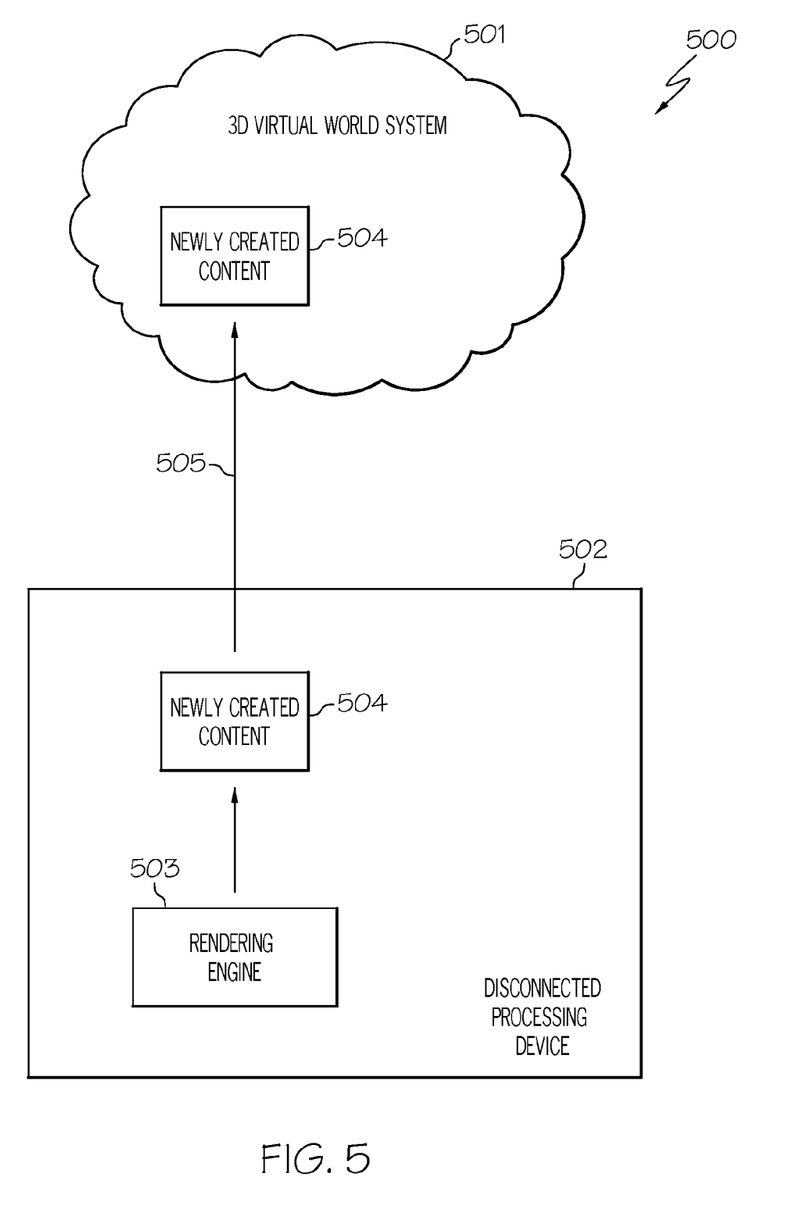
FIG. 5 is a system for generation and deployment of offline 3D virtual content according to an example embodiment of the present invention.

FIG. 5 shows a system for generation and deployment of offline 3D virtual content according to an example embodiment of the present invention. The system 500 may include a 3D virtual world system 501 and a processing device 502. A user may use a rendering engine 503 at the processing device 502 to generate and create new 3D virtual world content 504. The processing device 502 may then be connected to the 3D virtual world system where the newly created content 504 may be uploaded 505 to the 3D virtual world and deployed. The newly created content 504 may be deployed at a specific section of the 3D virtual world system 501.

Figure 6:
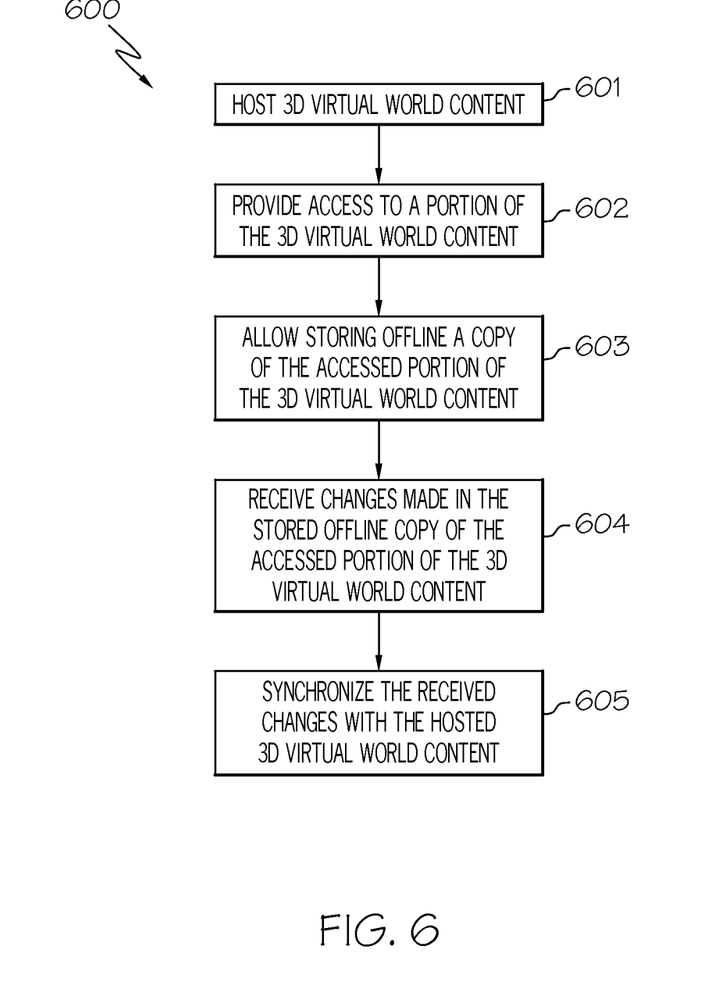
FIG. 6 is a flowchart of a process for generation and synchronization of offline three-dimensional (3D) virtual world content according to another example embodiment of the present invention.

FIG. 6 is a flowchart of a process for generation and synchronization of offline three-dimensional (3D) virtual world content according to another example embodiment of the present invention. In the process 600 in block 601 3D virtual world content may be hosted on a device such as a server. In block 602 access to a portion of the 3D virtual world content may be provided. In block 603 storing offline of a copy of the accessed portion of the 3D virtual world content may be allowed. In block 604 changes made in the stored offline copy of the accessed portion of the 3D virtual world content may be received. In block 605 the received changes may be synchronized with the hosted 3D virtual world content. The process 600 may operate on a server or other type processing device.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for providing virtual world content comprising:
   hosting virtual world content;
   providing access to the virtual world content;
   allowing a user to control an avatar to obtain three-dimensional objects corresponding to an accessed portion of the virtual world content;
   allowing storing offline of a copy of the accessed portion of the virtual world content;
   receiving changes made in the stored offline copy of the accessed portion of the virtual world content;
   synchronizing the received changes with the hosted virtual world content, wherein synchronizing the received changes with the hosted virtual world content comprises uploading changes in the stored offline copy of the accessed portion of the virtual world content to the hosted virtual world content; and
   preventing the accessed portion of the virtual world content from being changed until the received changes have been synchronized with the hosted virtual world content while simultaneously allowing multiple users to download and use the accessed portion.

2. The method according to claim 1, wherein the stored copy of the accessed portion of the virtual world content further comprises a cropped section of the hosted virtual world content.

3. The method according to claim 1, further comprising storing the changes made in the stored offline copy of the accessed portion of the virtual world content in a storage separate from where the copy of the accessed portion of the virtual world content is stored.

4. The method according to claim 1, wherein synchronizing the received changes with the hosted virtual world content further comprises updating the hosted virtual world content with the changes in the offline copy of the accessed portion of the virtual world content.

5. The method according to claim 1, further comprising updating the offline copy of the accessed portion of the virtual world content with changes that have occurred in the hosted virtual world content since the storing offline the copy of the accessed portion of the virtual world content.

6. A system for generation and synchronization of offline virtual world content comprising:
   a server; and
   a network interface coupling the server with a workstation, wherein the server hosts a virtual world content allowing a user at the workstation to control an avatar in the virtual world to obtain 3-dimensional objects corresponding to a selected portion of virtual world content in the virtual world and store offline a copy of the selected portion of virtual world content, the network interface further being capable of receiving changes made in the stored offline copy of the selected portion of virtual world content, the server being capable of synchronizing the received changes with the hosted virtual world content, wherein synchronizing the received changes with the hosted virtual world content comprises uploading changes in the stored offline copy of the accessed portion of the virtual world content to the hosted virtual world content, the server further being capable of preventing the selected portion of the virtual world content from being changed until the received changes have been synchronized with the hosted virtual world content while simultaneously allowing multiple users to download and use the selected portion.

7. A computer program product comprising a tangible medium having computer useable program code embodied therewith, the computer useable program code comprising:
   computer useable program code configured to host virtual world content; c
   computer useable program code configured to provide access to the virtual world content;
   computer useable program code configured to allow a user to control an avatar to obtain three-dimensional objects corresponding to an accessed portion of the virtual world content;
   computer useable program code configured to allow storing offline of a copy of the accessed portion of the virtual world content; and
   computer useable code configured to receive changes made in the stored offline copy of the accessed portion of the virtual world content and synchronize the received changes with the hosted virtual world content wherein the received changes are synchronized with the hosted virtual world content by uploading changes in the stored offline copy of the accessed portion of the virtual world content to the hosted virtual world content and prevent the accessed portion of the virtual world content from being changed until the received changes have been synchronized with the hosted virtual world content while simultaneously allowing multiple users to download and use the accessed portion.

8. The method according to claim 1, further comprising allowing cropping of a section of the virtual world content for execution of the stored offline virtual world content on a computer disconnected from a server hosting the virtual world content.

9. The method of claim 8, wherein allowing cropping of a section of the virtual world content comprises allowing a box to be drawn on a map of the hosted virtual world content to select the portion of the virtual world content for the stored offline virtual world content.

10. The method of claim 1, further comprising allowing a user to prevent other users from making changes to the portion of the virtual world content corresponding to the stored offline virtual world content.

11. The method of claim 1, further comprising allowing multiple portions of the hosted virtual world to be selected and executed offline.

12. A system for generation and synchronization of offline virtual world content, comprising:
   a processing device; and
   a network interface coupling the processing device and a server, wherein the server hosts a virtual world system allowing a user to control an avatar to obtain three-dimensional objects corresponding to a selected portion of the virtual world content in the virtual world system and to store a copy of the selected portion of virtual world content offline, the network interface further being capable of receiving changes made in the stored offline copy of the selected portion of the virtual world content, the hosted virtual world content being synchronized with the stored offline copy of the virtual world content by uploading changes in the stored offline copy to the hosted virtual world system and preventing the selected portion of the virtual world content from being changed until the received changes have been synchronized with the hosted virtual world content while simultaneously allowing multiple users to download and use the selected portion.

* * * * *